US012810580B2

(12) United States Patent
Jeon et al.

(10) Patent No.: US 12,810,580 B2
(45) Date of Patent: Nov. 24, 2026

(54) OBJECT DETECTION METHOD AND DEVICE USING TEMPLATE MATCHING

(71) Applicant: Research & Business Foundation Sungkyunkwan University, Suwon-si (KR)

(72) Inventors: Jae Wook Jeon, Suwon-si (KR); Jung Rok Kim, Suwon-si (KR); Han Sung Lee, Suwon-si (KR); Yong Hyeon Kwon, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 561 days.

(21) Appl. No.: 18/081,952

(22) Filed: Dec. 15, 2022

(65) Prior Publication Data

US 2023/0186595 A1 Jun. 15, 2023

(30) Foreign Application Priority Data

Dec. 15, 2021 (KR) ........................ 10-2021-0179910

(51) Int. Cl.
*G06V 10/75* (2022.01)
*G06T 3/40* (2024.01)
(Continued)

(52) U.S. Cl.
CPC .............. *G06V 10/751* (2022.01); *G06T 3/40* (2013.01); *G06T 5/20* (2013.01); *G06T 5/70* (2024.01);
(Continued)

(58) Field of Classification Search
None
See application file for complete search history.

(56) References Cited

U.S. PATENT DOCUMENTS 6,711,293 B1 * 3/2004 Lowe .................. G06V 10/462
382/220
9,619,733 B2 * 4/2017 Kim .................... G06V 10/426
(Continued)

FOREIGN PATENT DOCUMENTS

KR 10-2015-0111641 A 10/2015
KR 10-1826815 B1 2/2018
(Continued)

OTHER PUBLICATIONS

Lowe, "Distinctive Image Features from Scale-Invariant Keypoints", International Journal of Computer Vision 60(2), 91-110, 2004 (Year: 2004).*

(Continued)

*Primary Examiner* — Randolph I Chu
(74) *Attorney, Agent, or Firm* — NSIP Law

(57) ABSTRACT

Provided is an object detection method using template matching. The method includes a step of specifying a template image of an object that is to be detected in an input image and generating a descriptor of the specified template image, an image pyramid generation step of converting a scale of the input image and generating image patches, a step of determining a rotation angle of the input image, a step of generating a descriptor of the generated image patches based on the determined rotation angle, and a step of matching the descriptor of the specified template image and the descriptor of the generated image patches, thus detecting the object that is to be detected. Therefore, it is possible to detect an object in real time without being limited by the size, angle, type, etc. of the object that is to be detected.

9 Claims, 6 Drawing Sheets

(51) Int. Cl.
*G06T 5/20* (2006.01)
*G06T 5/70* (2024.01)
*G06V 10/46* (2022.01)
*G06V 10/77* (2022.01)

(52) U.S. Cl.
CPC .......... *G06V 10/46* (2022.01); *G06V 10/7715* (2022.01); *G06T 2207/20016* (2013.01)

(56) References Cited

U.S. PATENT DOCUMENTS

| | | | | |
|---|---|---|---|---|
| 10,818,032 | B2 * | 10/2020 | Zhu | G06T 7/60 |
| 11,004,212 | B1 | 5/2021 | Liu et al. | |
| 2015/0279048 | A1 * | 10/2015 | Kim | G06F 18/2163 382/199 |
| 2019/0197767 | A1 * | 6/2019 | Lin | G06T 17/005 |
| 2020/0402202 | A1 * | 12/2020 | Kumar | G06T 3/4007 |
| 2023/0186595 | A1 * | 6/2023 | Jeon | G06V 10/751 382/103 |
| 2024/0029408 | A1 * | 1/2024 | Liu | G06V 10/774 |

FOREIGN PATENT DOCUMENTS

| | | | |
|---|---|---|---|
| KR | 10-2018-0062683 | A | 6/2018 |
| KR | 10-1911912 | B1 | 10/2018 |

OTHER PUBLICATIONS

Korean Office Action issued on Apr. 25, 2024, in counterpart Korean Patent Application No. 10-2021-0179910 (6 pages in English, 6 pages in Korean).

* cited by examiner

【FIG. 1】
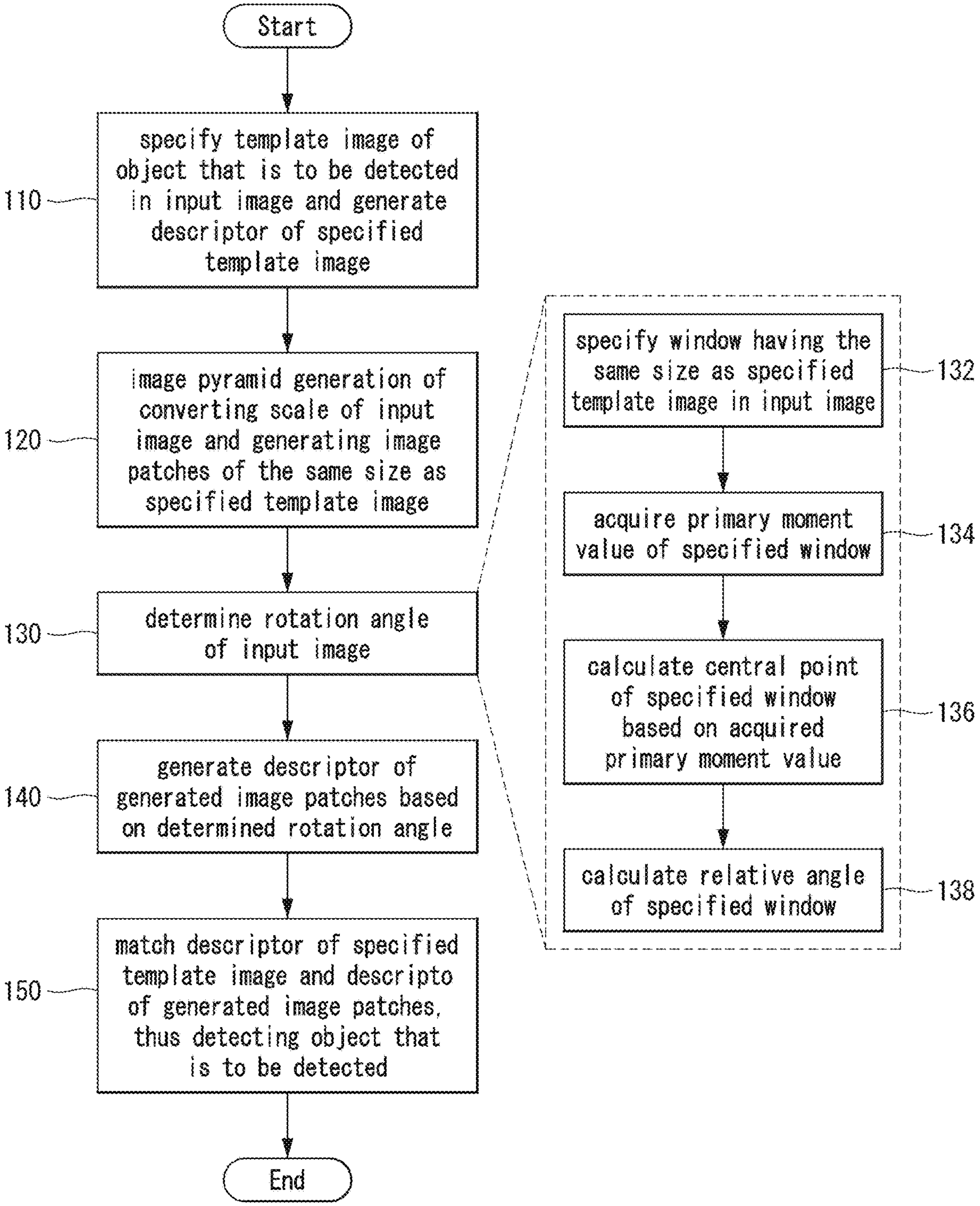

【FIG. 2】
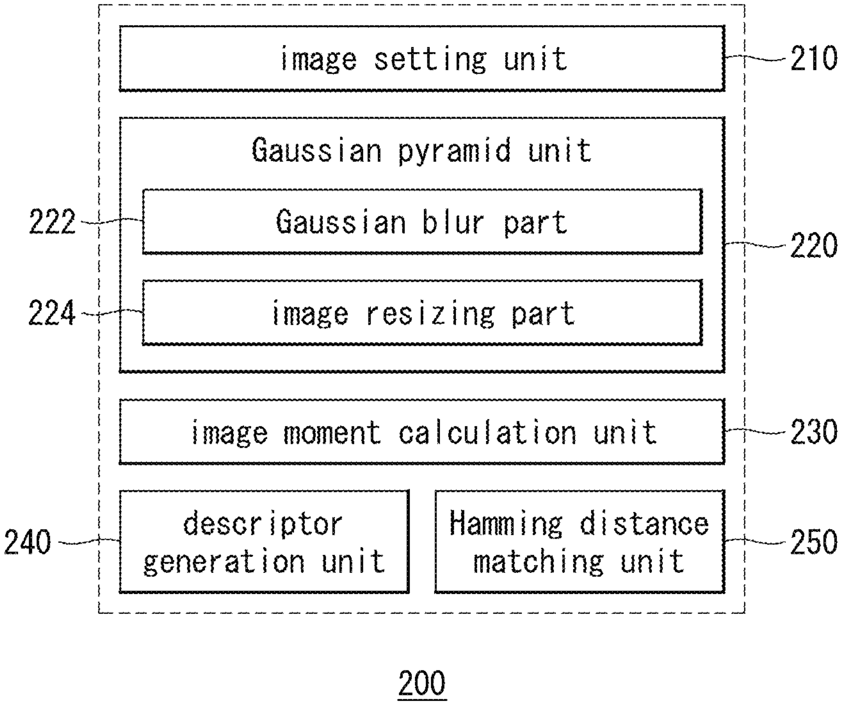
【FIG. 3】
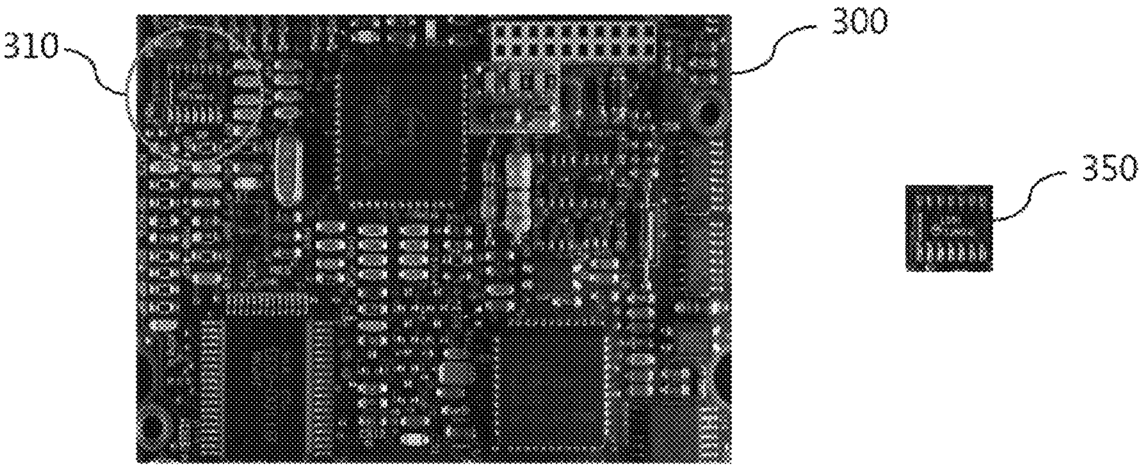

[FIG. 4]
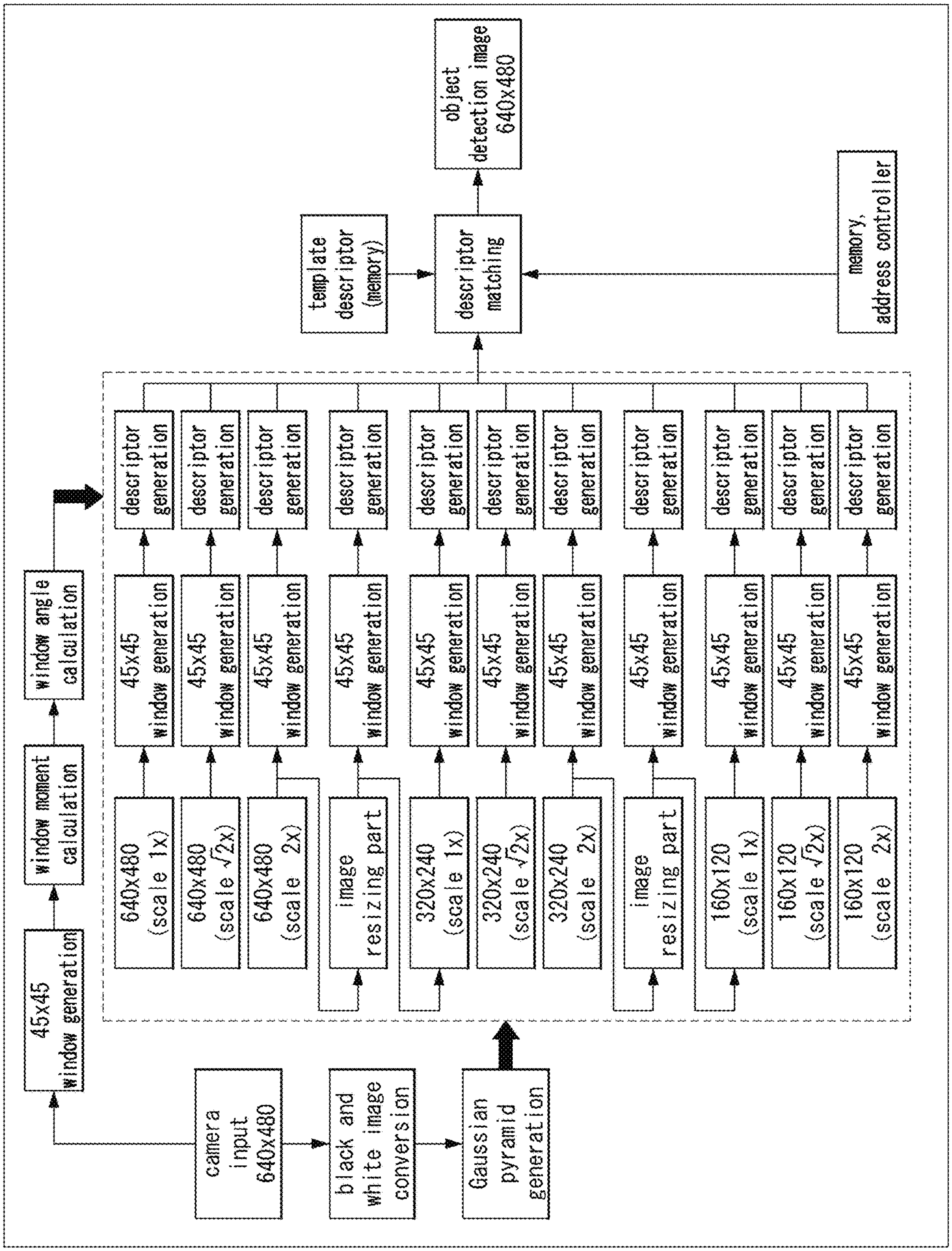

【FIG. 5】
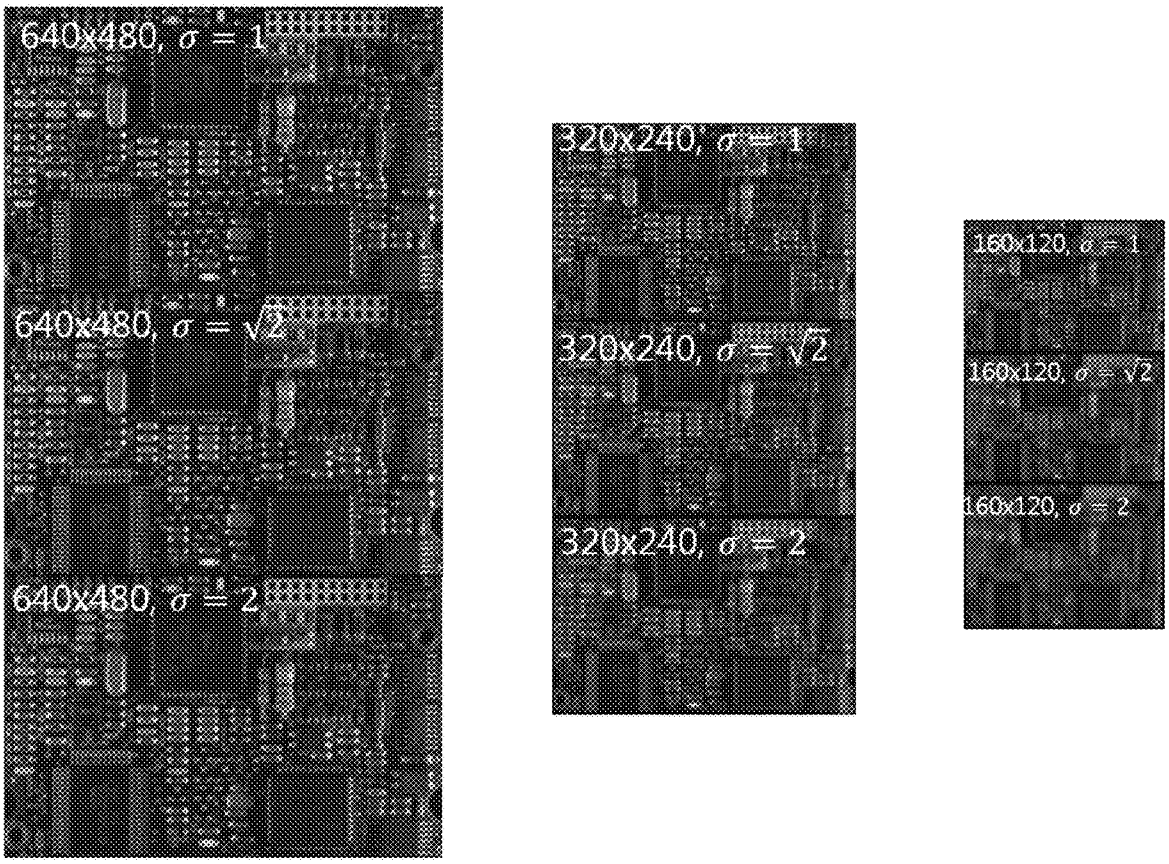

【FIG. 6】
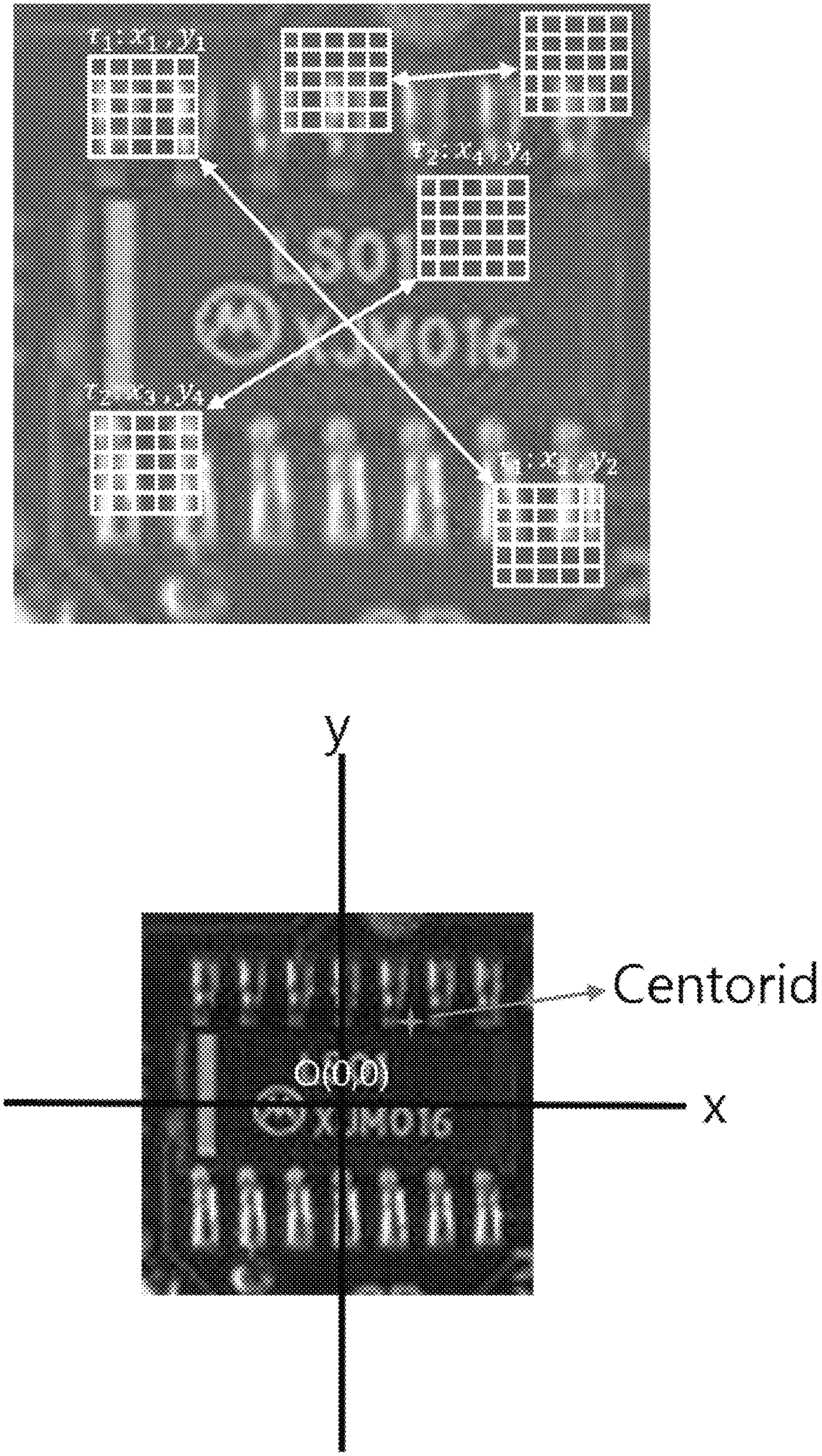

【FIG. 7】

| | rotation angle | correct-answer coordinate | | FPGA processing result | | accuracy | descriptor matching distance |
|---|---|---|---|---|---|---|---|
| Template1 | 0degrees | 61 | 86 | 61 | 86 | 100% | 251/256 |
| | 90degrees | 61 | 86 | 61 | 86 | 100% | 211/256 |
| | 180degrees | 61 | 86 | 61 | 86 | 100% | 251/256 |
| | 270degrees | 61 | 86 | 61 | 86 | 100% | 216/256 |

| | rotation angle | correct-answer coordinate | | FPGA processing result | | accuracy | descriptor matching distance |
|---|---|---|---|---|---|---|---|
| Template2 | 0degrees | 509 | 85 | 509 | 85 | 100% | 251/256 |
| | 90degrees | 509 | 85 | 509 | 85 | 100% | 233/256 |
| | 180degrees | 509 | 85 | 509 | 85 | 100% | 251/256 |
| | 270degrees | 509 | 85 | 509 | 85 | 100% | 233/256 |

OBJECT DETECTION METHOD AND DEVICE USING TEMPLATE MATCHING

CROSS-REFERENCE TO RELATED APPLICATIONS

This application is the National Stage filing under 35 U.S.C. 371 of KR Application No. 10-2021-0179910, filed on Dec. 15, 2021, the contents of which are all hereby incorporated by reference herein in their entirety.

BACKGROUND

Field

The present disclosure relates to an object detection method and device using template matching and, more particularly, to an object detection method and device using template matching, in which an object can be accurately detected in real time even if an object present in an original image is different in size and rotation angle from an object present in a template image.

Related Art

Among image analysis technologies, object detection or object tracking is a technology which detects the position of a predetermined object in each frame in video or continuous images, and is used in various fields such as computer vision, traffic, and security. Recently, a method mainly used in the object tracking is a template matching method, which is a method of finding an object most similar to a sample or template of an object to be tracked in an image.

Currently, the method of detecting and tracking an object using the template matching method based on images acquired through a camera is used for sign detection, vehicle tracking or the like, and is also used for detecting an object placed on a factory conveyor belt. In this case, in order to detect an object passing over a conveyor belt through the conventional method, the object should be aligned at a predetermined angle, and it is possible to detect only an object of a certain size.

Although a deep learning algorithm has been introduced and utilized to solve these problems, the object is not detected rapidly and it is often difficult to meet the amount of data required to implement a deep learning model. Further, the fact that high-end computer hardware is required also acts as a burden. Thus, in the object detection method using the template matching, there is a need for a method capable of detecting an object in real time without using the deep learning algorithm and without being limited by the size, angle, type, etc. of the object.

SUMMARY

The present disclosure provides an object detection method and device using template matching, which execute template matching through a descriptor by specifying an image patch based on the determined rotation angle and generation of an image pyramid of an input image so that a user in a computer vision field can efficiently detect and track an object.

In an aspect, an object detection method using template matching is provided. The method includes a step of specifying a template image of an object that is to be detected in an input image and generating a descriptor of the specified template image, an image pyramid generation step of converting a scale of the input image and generating image patches of the same size as the specified template image, a step of determining a rotation angle of the input image, a step of generating a descriptor of the generated image patches based on the determined rotation angle, and a step of matching the descriptor of the specified template image and the descriptor of the generated image patches, thus detecting the object that is to be detected.

In another aspect, an object detection device using template matching is provided. The device includes an image setting unit specifying a window and a template image of an object that is detected in an input image, a Gaussian pyramid unit converting a scale of the input image and generating image patches of the same size as the specified template image, an image moment calculation unit determining a rotation angle of the input image, a descriptor generation unit generating a descriptor of the template image and a descriptor of the image patches generated based on the determined rotation angle, and a Hamming distance matching unit matching the descriptor of the template image and the descriptor of the image patches.

In a further aspect, a recording medium readable by a digital processing device is provided, in which a program of instructions executable by the digital processing device is tangibly implemented to detect an object using template matching. A program for executing an object detection method using template matching according to an aspect of the present disclosure in a computer is recorded.

An object detection method and device using template matching according to an embodiment of the present disclosure provides the following effects.

It is possible to detect an object in real time without being limited by the size, angle, type, etc. of the object that is to be detected.

It is possible to detect an object without using a deep learning algorithm, so it is possible to rapidly detect the object without physical and time constraints for implementing a deep learning model.

Since it is necessary to store not an entire template image but only a descriptor corresponding to a template image when adding the template image, it is efficient in the amount of stored data.

BRIEF DESCRIPTION OF THE DRAWINGS

FIG. 1 is a flowchart illustrating an object detection method using template matching according to an embodiment of the present disclosure.

FIG. 2 is a block diagram illustrating an object detection device using template matching according to an embodiment of the present disclosure.

FIG. 3 is a diagram illustrating an illustrative input image and template image according to an embodiment of the present disclosure.

FIG. 4 is a diagram illustrating the more specific flow of an object detection method using template matching according to a specific embodiment of the present disclosure.

FIG. 5 is a diagram illustrating an image pyramid generated by the scale conversion of the input image according to a specific embodiment of the present disclosure.

FIG. 6 is a diagram illustrating a method of determining the rotation angle of an input image through a specific window according to an embodiment of the present disclosure.

FIG. 7 is a diagram showing a table in which a test is conducted with two different template images for one input image and results are summarized, according to an embodiment of the present disclosure.

DESCRIPTION OF EXEMPLARY EMBODIMENTS

Hereinafter, an embodiment of the present disclosure will be described in detail with reference to the accompanying drawings. However, it is to be understood that the present description is not intended to limit the present disclosure to those exemplary embodiments. When it is determined that the detailed description of the known art related to the present disclosure may be obscure the gist of the disclosure, the detailed description thereof will be omitted.

FIG. 1 is a flowchart illustrating an object detection method using template matching according to an embodiment of the present disclosure, FIG. 2 is a block diagram illustrating an object detection device using template matching according to an embodiment of the present disclosure, and FIG. 3 is a diagram illustrating an illustrative input image and template image according to an embodiment of the present disclosure.

Referring to FIGS. 1 and 3, the object detection method 100 using the template matching according to an embodiment of the present disclosure includes a step 110 of specifying a template image of an object that is to be detected in an input image and generating a descriptor of the specified template image, an image pyramid generation step 120 of converting a scale of the input image and generating image patches of the same size as the specified template image, a step 130 of determining the rotation angle of the input image, a step 140 of generating a descriptor of the generated image patches based on the determined rotation angle, and a step 150 of matching the descriptor of the specified template image and the descriptor of the generated image patches, thus detecting the object that is to be detected.

Referring to FIGS. 2 and 3, the object detection device 200 using the template matching according to an embodiment of the present disclosure includes an image setting unit 210 that specifies a window and a template image of an object that is detected in an input image, a Gaussian pyramid unit 220 that converts a scale of the input image and generating image patches of the same size as the specified template image, an image moment calculation unit 230 that determines the rotation angle of the input image, a descriptor generation unit 240 that generates a descriptor of the template image and a descriptor of the generated image patches based on the determined rotation angle, and a Hamming distance matching unit 250 that matches the descriptor of the template image and the descriptor of the image patches.

First, the image setting unit 210 of the object detection device 200 using the template matching specifies a template image 350 of an object 310 that is to be detected in an input image 300, generates 110 the descriptor of the specified template image 350 from the descriptor generation unit 240, and stores it in a block memory (not shown). Subsequently, the Gaussian pyramid unit 220 converts the scale of the input image 300 and generates 120 the image patches (not shown) of the same size as the specified template image.

In an embodiment of the present disclosure, when one template image matches with input images converted in various sizes, detection is possible even if an object on the template image is different in size from an object located at the input image, and the input images in various sizes may correspond to an image pyramid.

According to an embodiment of the present disclosure, in the generation 120 of the image pyramid, an image having a continuous scale may be generated by enlarging the scale of the input image 300 and reducing resolution in half at a point where a magnification is doubled, image patches may be generated, respectively, from the images of the input image 300 generated in this way.

The Gaussian pyramid unit 220 includes a Gaussian blur part 222 and an image resizing part 224. The Gaussian blur part 222 performs an operation of enlarging the scale of the input image to the point where the magnification is doubled. The image resizing part 224 performs an operation of reducing the resolution in half.

In an embodiment of the present disclosure, the scale of the input image 300 may be enlarged using the Gaussian pyramid technique of convoluting the input image and a Gaussian kernel, and equations used in this case are as follows.

$$g_\sigma(x, y) = \frac{1}{2\pi\sigma^2} e^{-(x^2+y^2)/2\sigma^2} \quad \text{[Equation 1]}$$

$$g_{\sigma_1} * g_{\sigma_2} = g_\sigma,\ \sigma_1^2 + \sigma_2^2 = \sigma^2 \quad \text{[Equation 2]}$$

If the image and the Gaussian kernel are convoluted using Equation 1 and Equation 2, the scale of the image is enlarged by the magnification σ of the original image, and images with multiple scales may be continuously generated while reducing the resolution in half at the point a value σ becomes 2, that is, the point where the magnification is doubled.

FIG. 5 is a diagram illustrating an image pyramid generated by the scale conversion of the input image according to a specific embodiment of the present disclosure, and is a case where three types of magnification values are applied depending on the size of the image.

Turning back to FIG. 1, the step 130 of determining the rotation angle of the input image according to an embodiment of the present disclosure includes a step 132 that specifies a window having the same size as the specified template image in the input image, a step 134 that acquires a primary moment value of the specified window, a step 136 that calculates a central point of the specified window based on the acquired primary moment value, and a step 138 that calculates a relative angle of the specified window.

The image setting unit 210 specifies the window (not shown) having the same size as the specified template image 350 in the input image 300, and the image moment calculation unit 230 acquires the primary moment value of the specified window, calculates the central point of the specified window based on the acquired primary moment value, and calculates the relative angle of the specified window based on the calculated central point.

According to an embodiment of the present disclosure, in order to detect the angle of the input image 300, a method in which the window is specified to have the same size as that of the previously specified template image 350 in the input image and then the angle of the specified window is detected may be performed.

To be more specific, the central point of the specified window is calculated using an intensity centroid method.

$$m_{pq} = \sum_{x,y\in r} x^p y^q I(x, y),\ p, q, = 0 \text{ or } 1 \quad \text{[Equation 3]}$$

The primary moment of the specified window is calculated using Equation 3. In this case, it is to be noted that the primary moment for the entire input image is not calculated.

The central point for the specified window is calculated using the following Equation 4 based on the calculated primary moment value. For reference, the lower drawing of FIG. 6 is a diagram showing the central point calculated using the primary moment in the specified window.

$$C = \left(\frac{m_{10}}{m_{00}}, \frac{m_{01}}{m_{00}}\right) \quad \text{[Equation 4]}$$

Finally, the rotation angle of the input image 300 may be determined by applying atan2 to the calculated central point and thereby measuring a relative angle value between-180 and 180 degrees.

According to an embodiment of the present disclosure, the generation 140 of the descriptor may be performed by generating the descriptors of the generated image patches based on the rotation angle determined by the descriptor generation unit 240. This will be described in detail as follows.

$$\tau(p : x, t) := \begin{cases} 1, & p(x) < p(y) \\ 0, & \text{otherwise} \end{cases} \quad \text{[Equation 5]}$$

$$f_{n_d}(p) := \sum_{1 \le i \le n_d} 2^{i-1} \tau(p : x_i, y_i) \quad \text{[Equation 6]}$$

Using Equations 5 and 6 above, a descriptor having a data size of $n_d$ bits is generated. In an embodiment of the present disclosure, the $n_d$ value may be 256, but it should be noted that the present disclosure is not limited thereto. In order to generate the descriptor of $n_d$ bits using Equation 5, $n_d$ pairs of x and y coordinates are required, and x and y coordinate pairs of a binary test are extracted according to an isotropic Gaussian $$\left(0, \frac{1}{2\sigma^2} S^2\right).$$

For reference, the upper drawing of FIG. 6 is a diagram showing that x and y coordinate pairs are indicated on the specified window when generating the descriptor.

In order to detect an object through the template image regardless of the direction of the image patch (i.e., the direction of the input image), the x and y coordinates are rotated based on the rotation angle of the input image 300 determined through the above-described primary moment, thus generating the descriptor. This will be calculated by the following Equation 7.

$$S = \begin{pmatrix} x_1, \ldots, x_n \\ y_1, \ldots, y_n \end{pmatrix}, S_\theta = R_\theta S \quad \text{[Equation 7]}$$

The detection 150 of the object is performed by matching the descriptor of the specified template image 350 that is generated in the descriptor generation unit 240 and then is stored in the block memory (not shown) and the descriptors of the image patches generated in the image pyramid, as described above. This is performed in the Hamming distance matching unit 250.

An embodiment of the present disclosure will be described in greater detail. That is, the descriptors of windows for each size are generated in the image pyramid in which the input image is converted into various sizes, and the descriptors generated as such are matched with the descriptor of the template image stored in the block memory. To be more specific, matching is performed if it is greater than a certain threshold value through the Hamming distance calculation. The matched coordinates are output in real time to detect and track the object.

FIG. 4 is a diagram illustrating the more specific flow of an object detection method using template matching according to a specific embodiment of the present disclosure. In an embodiment of the present disclosure, the input image may have the size of 640×480, and the object may be detected through the process of FIG. 4.

FIG. 7 is a diagram showing a table in which a test is conducted with two different template images for one input image and results are summarized, according to an embodiment of the present disclosure.

FIG. 7 shows the result of matching each template image by rotating it at 0 degrees, 90 degrees, 180 degrees, and 270 degrees, respectively. Since the FPGA processing result and the coordinates of the correct answer were exactly matched, the accuracy was 100%. When the descriptors were matched using the Hamming distance calculation method, the average accuracy of the descriptor matching was 90%.

As described above, an embodiment of the present disclosure provides an object detection method and device using template matching, which execute template matching through a descriptor by specifying an image patch based on a determined rotation angle and generation of an image pyramid of an input image, so that is possible to detect an object in real time without being limited by the size, angle, type, etc. of the object that is to be detected, it is possible to detect an object without using a deep learning algorithm and thereby it is possible to rapidly detect the object without physical and time constraints for implementing a deep learning model, and it is efficient in the amount of stored data because it is necessary to store not an entire template image but only a descriptor corresponding to a template image when adding the template image.

Meanwhile, the embodiments of the present disclosure can be implemented as computer readable codes in a computer readable recording medium. The computer readable recording medium includes all types of recording devices in which data that can be read by a computer system is stored.

Examples of the computer readable recording medium may include Read-Only Memory (ROM), Random Access Memory (RAM), CD-ROM, magnetic tape, floppy disk, optical data storage devices, etc., and also include implementations in the form of carrier waves (e.g., transmission over the Internet). Further, the computer readable recording medium may be distributed to computer systems connected through a network, so that computer readable codes may be stored and executed in a distributed manner. In addition, functional programs, codes, and code segments for implementing the present disclosure can be easily inferred by programmers in the technical field to which the present disclosure belongs.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A processor-implemented method for object detection, the method comprising:

specifying a template image of an object to be detected in an input image and generating a descriptor of the specified template image;

converting a scale of the input image in an image pyramid generation operation and generating image patches of a same size as the specified template image;

determining a rotation angle of the input image;

generating a descriptor of the generated image patches based on the determined rotation angle; and matching the descriptor of the specified template image and the descriptor of the generated image patches, thus detecting the object that is to be detected, wherein, in the mid q tion n image having a continuous scale is generated by enlarging the scale of the input image and reducing resolution in half at a point where a magnification is doubled, and thereby image patches are generated, wherein the generating of the descriptor generates the descriptor by rotating a coordinate pair of the generated image patches using the determined rotation angle.

2. The method of claim 1, wherein the scale of the input image is enlarged using a Gaussian pyramid technique of convoluting the input image and a Gaussian kernel.

3. The method of claim 1, wherein the determining of the rotation angle of the input image comprises:

specifying a window having the same size as the specified template image in the input image;

acquiring a primary moment value of the specified window;

calculating a central point of the specified window based on the acquired primary moment value; and calculating a relative angle of the specified window based on the calculated central point.

4. The method of claim 1, wherein the descriptors have a data size of 256 bits.

5. An object detection device using template matching, the device comprising:

a processor configured to:

specify a window and a template image of an object that is detected in an input image;

convert a scale of the input image and generate image patches of the same size as the specified template image;

determine a rotation angle of the input image;

generate a descriptor of the template image and a descriptor of the image patches generated based on the determined rotation angle; and match the descriptor of the template image and the descriptor of the image patches, wherein, for converting the scale of the input image and generating the image patches, the processor comprises a Gaussian blur part and an image resizing part, and at a point where the Gaussian blur part enlarges the scale of the input image so that a magnification is doubled, resizing part generates an image having continuous scale by reducing resolution in half, thus generating the image patches, wherein, for generating the descriptor of the template image and the descriptor of the image patches, the processor is configured to generate a descriptor by rotating a coordinate pair of the generated image patches using the determined rotation angle when generating the descriptor of the generated image patches.

6. The object detection device of claim 5, wherein the scale of the input image of the Gaussian blur part is enlarged using a Gaussian pyramid technique of convoluting the input image and a Gaussian kernel.

7. The object detection device of claim 5, wherein, in determining the rotation angle of the input image, the processor specifies a window having the same size as the specified template image in the input image, and the processor acquires a primary moment value of the specified window, calculates a central point of the specified window based on the acquired primary moment value, and calculates a relative angle of the specified window based on the calculated central point.

8. The object detection device of claim 5, wherein the descriptors have a data size of 256 bits.

9. A non-transitory computer-readable storage medium storing instructions that, when executed by a processor, configure the processor to detect an object using the method of claim 1.

* * * * *